United States Patent [19]

Humphrey et al.

[11] 4,031,698
[45] June 28, 1977

[54] SPLIT FLOW INJECTOR FOR SOLID FUEL RAMJETS

[75] Inventors: John M. Humphrey, San Jose; Allen L. Holzman, Palo Alto, both of Calif.

[73] Assignee: The United States of America as represented by the Secretary of the Navy, Washington, D.C.

[22] Filed: Aug. 6, 1976

[21] Appl. No.: 712,421

[52] U.S. Cl. .................. 60/251; 60/270 S; 60/39.72 R
[51] Int. Cl.² .......................................... F02K 9/04
[58] Field of Search ............ 60/270 S, 251, 258, 60/39.46 S, 253, 254, 255, 256, 39.72 R

[56] References Cited
UNITED STATES PATENTS

| | | | |
|---|---|---|---|
| 2,799,987 | 7/1957 | Chandler | 60/270 S |
| 3,038,303 | 6/1962 | Gose | 60/253 |
| 3,555,826 | 1/1971 | Bennett | 60/251 |

*Primary Examiner*—William L. Freeh
*Assistant Examiner*—Robert E. Garrett
*Attorney, Agent, or Firm*—R. S. Sciascia; Roy Miller

[57] ABSTRACT

A split flow injector for solid fuel ramjets (SFRJ) having a tube injected into the injector port of a SFRJ to split the air into two streams wherein the primary airflow through the annular area around the tube is injected into the recirculation region just inside the injector port to stabilize combustion.

5 Claims, 5 Drawing Figures

SPLIT FLOW INJECTOR FOR SOLID FUEL RAMJETS

BACKGROUND OF THE INVENTION

The present invention relates to ramjets, and more particularly to split flow injector for a solid fuel ramjet.

Two important problem areas have been identified from studies of the fundamental operating characteristics of solid fuel ramjets (SFRJ):

1. Airflow uniformity requirements together with the weight, volume and pressure drop required for flow straighteners; and
2. Injector sizing requirements and the limits that are placed on fuel loading and performance.

Solid fuel ramjets require an injector step to create a recirculation region to sustain combustion. The size of the recirculation region may be defined in terms of the fuel port area to injector port area ratio, $A_p/A_i$. The area ratio limits fuel loading for reasonable pressure drops across the injector. Furthermore, even relatively small non-uniformities in the flow field can significantly increase the fuel port to injector port area ratio required to sustain combustion. Thus, some trade-off is required between lower fuel loading (reduced range) and the use of upstream flow straighteners to reduce the non-uniformities in the flow field.

SUMMARY OF THE INVENTION

The present invention provides a split flow injector by using an inner tube in the injector port to split the airstream into two streams. The annular area between the tube and the injector port injects the primary airflow into the recirculation region to stabilize combustion. The secondary airflow through the tube is injected downstream of the recirculation region.

DESCRIPTION OF THE PREFERRED EMBODIMENT

Figure 1:
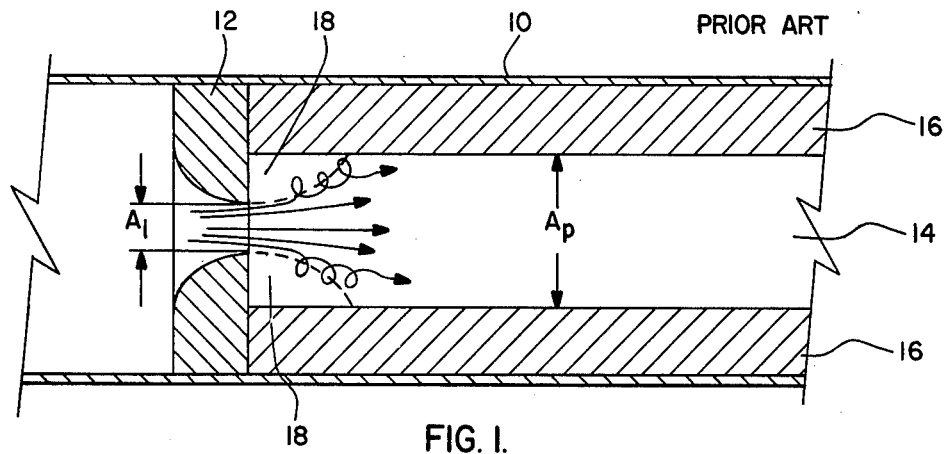
FIG. 1 is a cross-sectional view of a prior art injector port for a solid fuel ramjet.

Referring now to FIG. 1, a single injector ramjet having a ramjet casing 10, an injector port 12 of area $A_i$, a fuel port 14 of area $A_p$, solid fuel 16 lining the casing and delineating the fuel port, and a nozzle (not shown) with throat area $A_t$ downstream from the fuel port has a recirculation region 18, indicated by dotted lines, downstream from and adjacent to the injector port. The arrows represent the flow field through the injector port 12 into the recirculation region 18 and fuel port 14.

Figure 2:
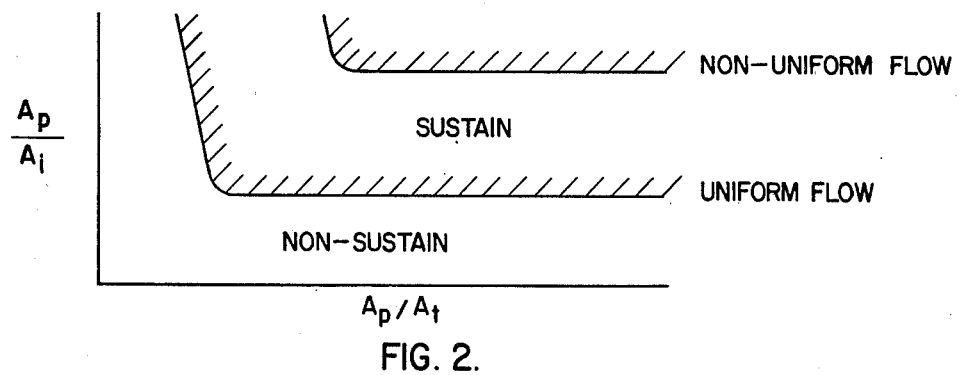
FIG. 2 is a graph illustrating the effect on non-uniform flow on ramjet combustion.

Since fuel loading, and thus range, is a function of the area of the fuel port, $A_p$, referring to the graph of FIG. 2, for a given size ramjet and injector port a larger $A_p$ is required to sustain combustion for the case of non-uniform flow, which large $A_p$ is attained at the cost of reduced fuel loading.

Figure 3:
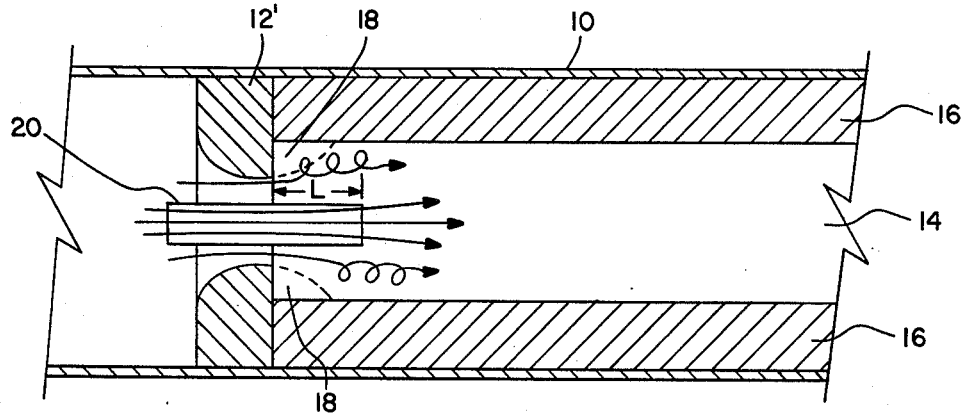
FIG. 3 is a cross-sectional view of a split flow injector port for a solid fuel ramjet.

FIG. 3 shows a split flow injector port 12' with an inner tube 20 in the injector port which splits the airflow into two streams, a primary stream and a secondary stream. The primary stream is that part of the airflow which travels in the annular region between the inner tube 20 and the injector port 12', and is injected into the recirculation region 18 to stabilize combustion. The primary stream consists of approximately 20 percent of the total airflow. The secondary stream is injected into the fuel port 14 downstream of the recirculation region 18 and has the effect of smoothing the airflow.

Figure 4:
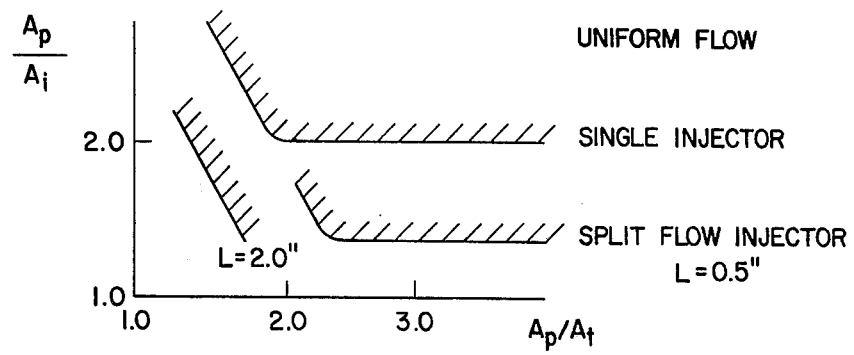
FIG. 4 is a graph illustrating the effect of the present invention on ramjet combustion.

The graph of FIG. 4 illustrates the advantage of the split flow injector over the single injector. For a 2.5 inch diameter casing an injection distance, L, for the secondary stream 0.5 inch downstream of the injector port 12' sufficed to avoid distubing the recirculation region. With a primary area ration, $A_p/A_i$, of roughly 3.0 and with the primary stream flowing through an annular region of area equal to 20 percent of $A_i$, a strong enough recirculation region 18 to sustain combustion at a fuel port to injector port area ratio of only 1.4 was created. The downstream injection distance scales up to 1.5 inch and 3.0 inch for 8 inch and 15 inch diameter hardware, respectively. Thus, the reduction of $A_p/A_i$ from approximately 2.0 to 1.4 by using the split flow injector significantly improves allowable fuel loading.

The split flow injector also offers significant reductions in flow straightener. The inner tube 20 creates a longer L/D injector, where L = injection distance downstream from injector port, with a much smaller hydraulic radius, promoting a less turbulent, more axial airflow. This effect is illustrated in FIG. 4 by comparing the effect upon the primary area ratio, $A_p/A_i$, for L = 2.0 inch and L = 0.5 inch.

Additionally, the split flow injector allows the recirculation region 18 to be designed with large area ratios to overcome non-uniform flow effects without penalizing the entire injector. Therefore, the split flow injector allows a longer solid fuel grain length for a given ramjet length than a single injector by reducing the flow straightening length upstream of the injector port.

Figure 5:
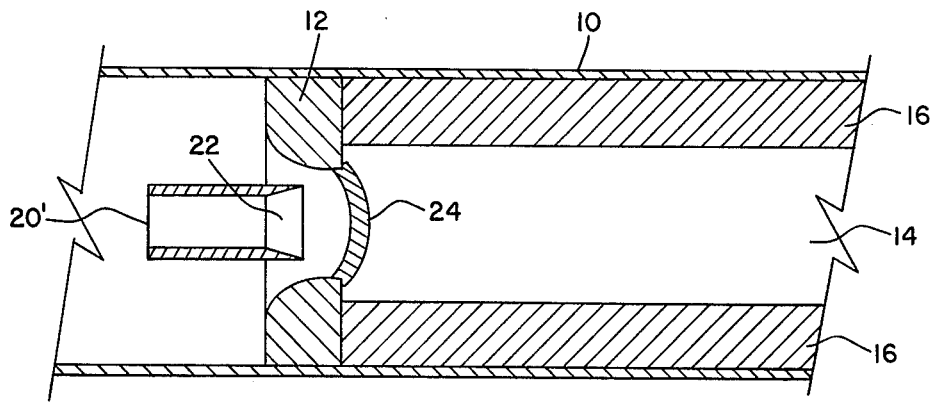
FIG. 5 is a cross-sectional view of another embodiment of the present invention.

As illustrated in FIG. 5 the split flow injector may be used to break frangible injector port covers and may be integrated easily into other chamber sealing approaches during boost. The inner tube 20' is constructed with a chisel edge 22 and is driven through a frangible glass injector port cover 24 by any suitable means to initiate the sustain phase. Since both primary and secondary airstreams come from a single source, no seals are required on the translating inner tube 20'.

Thus, the split flow injector reduces the critical area ratio parameters for non-axisymmetric inlets upstream of the injector port with an optimum primary stream fraction of approximately 20 percent. Larger primary stream fractions allow the non-symmetrical flow effects to continue through the injector port, while smaller fractions (10 percent or less of the total flow) result in insufficient flow to maintain a good recirculation region.

What is claimed is:

1. In a solid fuel ramjet, having a casing with an injector port and a fuel port with a recirculation region adjacent to and downstream from said injector port, the improvement comprising:

an inner tube situated centrally in said injector port and extending into said fuel port to divide an airflow through said injector port into a primary and secondary airstream, said primary airstream being injected into said recirculation region to stabilize combustion and said secondary airstream being injected into said fuel port downstream from said recirculation region to smooth said airflow.

2. An improved solid fuel ramjet as recited in claim 1 wherein said primary airstream comprises greater than 10 percent up to approximately 20 percent of said airflow.

3. An improved solid fuel ramjet as recited in claim 2 wherein said primary airstream comprises approximately 20 percent of said airflow.

4. An improved solid fuel ramjet as recited in claim 3 wherein the extension of said inner tube into said fuel port comprises a distance equal to at least 20 percent of the diameter of said casing.

5. An improved solid fuel ramjet as recited in claim 4 further comprising a frangible injector port cover mounted on said injector port to prevent air flow therethrough, wherein said inner tube is translatably mounted along the axis of said injector port, the downstream edge of said inner tube being chisel-shaped; and
means for translating propelling said inner tube from a first position upstream from said frangible injector port cover to a second position within said injector port and extending into said fuel port such that said frangible port cover is broken by the impact of said inner tube against said cover to allow airflow through said injector part.

* * * * *